United States Patent
Lichtinger

(10) Patent No.: US 6,548,001 B1
(45) Date of Patent: Apr. 15, 2003

(54) METHOD FOR CONNECTING SEVERAL PLASTIC COMPONENTS THROUGH INJECTION MOLDING AROUND THE SPRUE

(75) Inventor: Peter Lichtinger, Fürstenfeldbruck (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 09/623,783
(22) PCT Filed: Mar. 6, 1999
(86) PCT No.: PCT/EP99/01457
§ 371 (c)(1), (2), (4) Date: Sep. 19, 2000
(87) PCT Pub. No.: WO99/44802
PCT Pub. Date: Sep. 10, 1999

(30) Foreign Application Priority Data

Mar. 6, 1998 (DE) .......................... 198 09 753

(51) Int. Cl.⁷ .................. B29C 51/00; B29C 53/00
(52) U.S. Cl. ............... 264/161; 264/250; 264/255; 264/271.1; 264/274; 264/297.2
(58) Field of Search ............... 264/252, 271.1, 264/275, 250, 254, 255, 273, 274, 328.8, 161, 328.9, 297.2; 425/126.1, 129.1

(56) References Cited

U.S. PATENT DOCUMENTS

| | | | |
|---|---|---|---|
| 3,655,308 A | | 4/1972 | Kutik et al. |
| 4,225,548 A | * | 9/1980 | Wassmann .................. 264/130 |
| 4,495,740 A | * | 1/1985 | Sarrazin et al. ............. 264/255 |
| 4,830,804 A | * | 5/1989 | Weaver ..................... 264/139 |
| 5,131,778 A | | 7/1992 | Asai et al. |
| 5,156,792 A | * | 10/1992 | Holdaway et al. .......... 264/230 |
| 5,362,428 A | * | 11/1994 | Tsujino et al. ............. 156/107 |
| 5,401,453 A | * | 3/1995 | Moretz et al. .............. 264/161 |
| 5,817,268 A | * | 10/1998 | Ito .............................. 264/251 |
| 6,174,482 B1 | * | 1/2001 | Reames et al. ............. 264/240 |

FOREIGN PATENT DOCUMENTS

| | | |
|---|---|---|
| DE | 29 38 622 A | 4/1981 |
| DE | 30 44 851 A | 7/1982 |
| EP | 0 295 587 A | 12/1988 |
| EP | 0 768 163 A | 4/1997 |

* cited by examiner

Primary Examiner—Angela Ortiz
(74) Attorney, Agent, or Firm—Henry M. Feiereisen

(57) ABSTRACT

A method of producing molded parts from several components in plastics processing machines is described, whereby for each component plasticized plastic material is injected into cavities formed by two mold halves, and whereby a sprue element (4) is provided at least for the first component (1). The sprue element of at least the first component remains on the molded part and is molded around, entirely or partially, by the next component during one of the following working cycles. This saves additional working steps for the removal of the sprue and prevents possible impurities of the environment, especially in the case of brittle material,

10 Claims, 1 Drawing Sheet

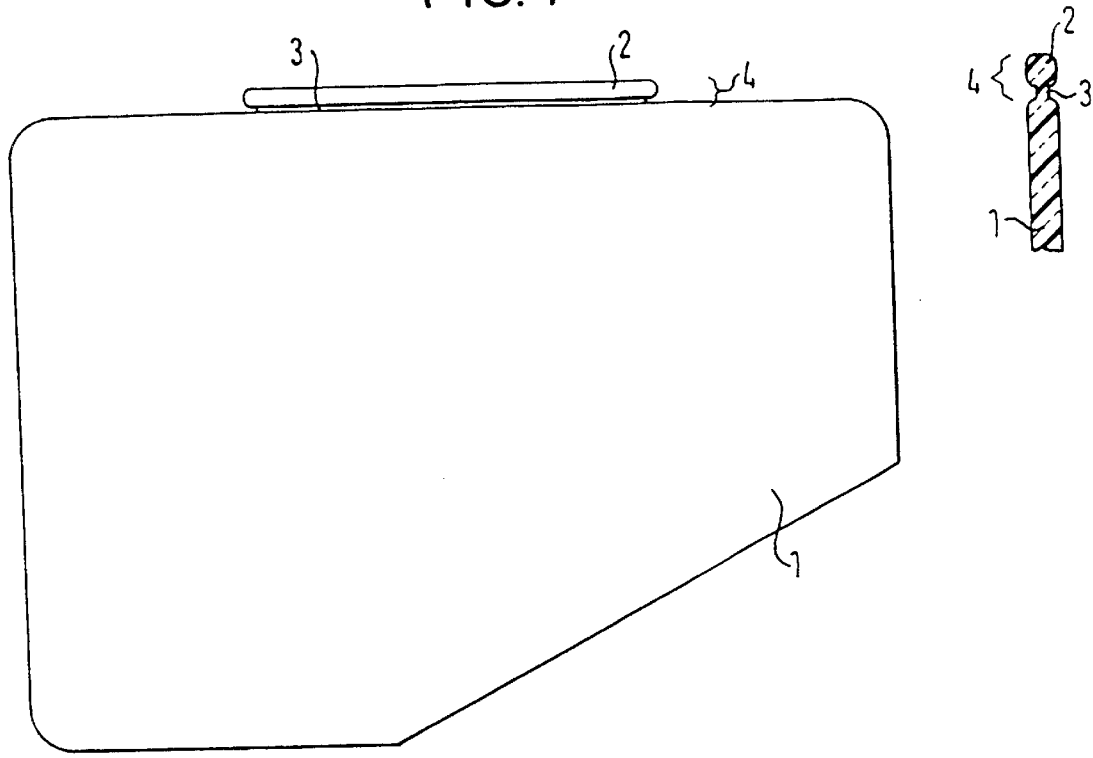
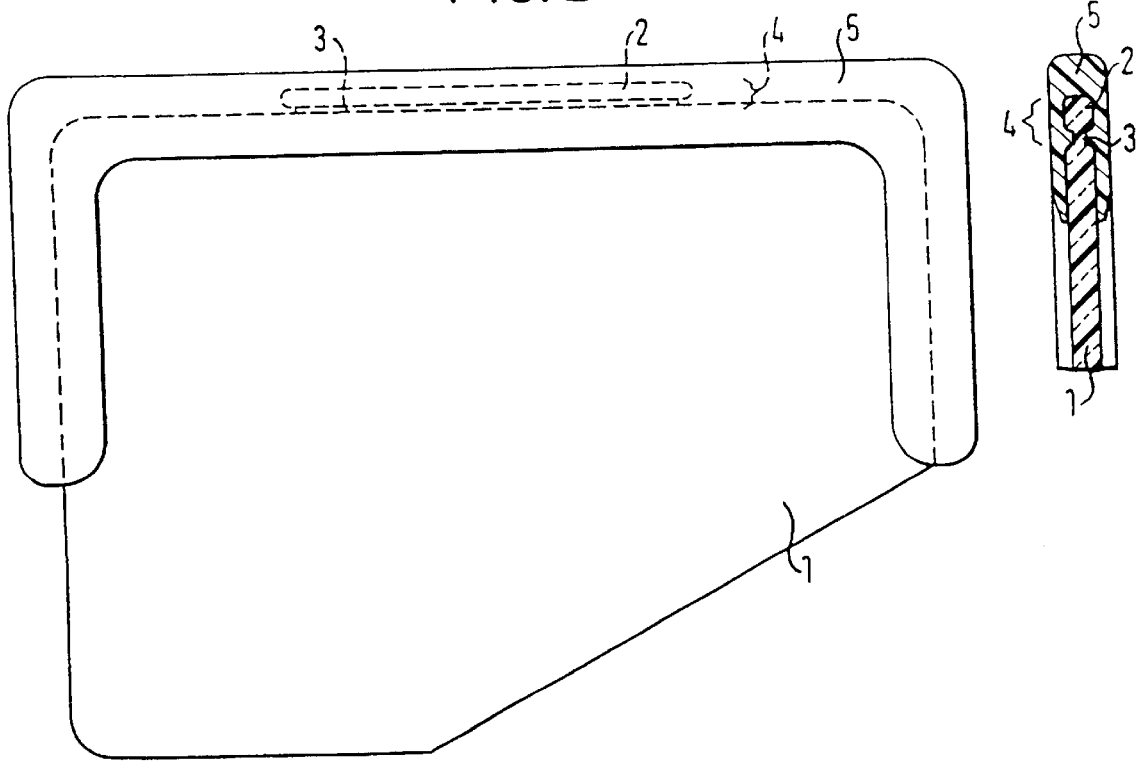

METHOD FOR CONNECTING SEVERAL PLASTIC COMPONENTS THROUGH INJECTION MOLDING AROUND THE SPRUE

BACKGROUND OF THE INVENTION

The invention relates to a method for, making molded parts from several components in plastics processing machines. Preferred field of application of the invention is the production of plastic panes, in particular for the automotive industry.

The manufacture of window panes uses plastic material which becomes brittle after curing. The subsequent separation of the member that is molded on laterally, the so-called sprue, generates, on the one hand, tension in the plastic panes and, on the other hand, particles are released as a consequence of the brittle material and deposit to some extent on the article, so that an unobjectionable product can only be produced by providing additional working steps (washing/drying). In order to fill the cavity as evenly as possible for the large-area molded part, e.g. to prevent streaks, the molding from the side must be implemented with a widest possible sprue. Therefore, the plasticized plastic material is supplied via a manifold with film gating of the cavity. The film gate is realized by configuring the sprue in the form of a slot die.

The invention is now based on the object to obviate the drawbacks associated with the sprue separation, in particular in the case of brittle material.

According to one aspect of the method of the invention, molded parts having several components can be made in a plastics processing machine by providing a sprue element for at least a first component and injecting plasticized plastic material for at least the first component in cavities formed by two mold halves to form a first molded component. While the sprue element of at least the first component remains on the first molded component, plasticized plastic material for at least one additional component is injected in the cavities formed by two mold halves, with the plasticized plastic material for the at least one additional component being molded at least partially around the sprue element. In accordance with the invention, the afore-stated problems are avoided because the sprue separation can now be entirely abolished. Accordingly it is proposed to leave the sprue element on the molded part and to mold around the sprue element in one of the following working cycles.

Embodiments of the invention can include one or more of the following features. The molded part can be a two-dimensional molded part, such as a pane, for example a side pane for an automobile. The sprue can be performed across an edge of the molded part, using at least one manifold and at least one subsequent film gate which can have a cylindrical cross section. The last component of the several components is preferably made of a material that does not substantially release particles during sprue removal. The sprue can be either broken off or cut off. The last component can also be molded on without the sprue element. The second and each additional component can be molded on without the sprue and can include functional elements, such as a strip with holes for attachment to a window lifting mechanism of an automobile has the particular advantage that the sprue element of the first cycle ensures a secure and stable seat of the second part which is molded around, and that functional elements can be provided at the same time in this second part.

BRIEF DESCRIPTION OF THE DRAWING

The invention will now be described in more detail with reference to an exemplified embodiment. It is shown in:

FIG. 1 a plan view of a plastic pane which has been manufactured in a first cycle of an injection compression process, FIG. 2 encapsulation by injection molding with second component in cycle 2.

DETAILED DESCRIPTION OF PREFERRED EMBODIMENTS

According to the preferred field of application of the present invention, a plastic pane 1, for example a side window of a passenger car, is made by injection compression process, with the plasticized plastic material supplied via a manifold 2 of substantially cylindrical cross section and a film gate 3 to a cavity which forms a molded part. The manifold 2 and the film gate 3 form a sprue 4 which is provided on the one side of the plastic pane that vanishes during subsequent installation in the passenger car during further processing steps. FIG. 2 shows the manner as to how a second component 5 is molded around a marginal area of the plastic pane 1, which area contains the sprue 4. This second component is normally not transparent and may be molded on without sprue. Attached to this second component may, for example, be the lifting mechanism for operating the side window. If desired, further components may be injection-molded, entirely or partially, around the plastic molded part.

What is claimed is:

1. Method for making molded parts having several components in a plastics processing machine, comprising injecting plasticized plastic material through a sprue for at least a first component in cavities formed by two mold halves to form at least the first molded component with an integrally formed sprue element disposed on at least the first molded component, and in a subsequent processing step, injecting on the same side of the sprue plasticized plastic material for at least one additional component and molding the plasticized plastic material for the at least one additional component at least partially around the sprue element.

2. Method according to claim 1, wherein the molded part is a two-dimensional molded part and the sprue is formed across an edge of the molded part.

3. Method according to claim 2, wherein the sprue is formed via at least one manifold and at least one subsequent film gate.

4. Method according to claim 3, wherein the at least one manifold has a substantially cylindrical cross section.

5. Method according to claim 1 wherein a last component of the several components comprises a material that does not substantially release particles during sprue removal.

6. Method according to claim 1, wherein a last component of the several components is molded on without a sprue element.

7. Method according to claim 2, wherein the each component following the first component is molded on without a sprue and provided with functional elements.

8. Method according to claim 7, wherein the molded part is a window pane for motor vehicles, and further comprising molding on the first component a strip forming a second component and providing on the second component functional elements for attachment of a lifting mechanism.

9. Method according to claim 2, wherein the molded part is a pane.

10. Method according to claim 8, wherein the functional elements are holes.

* * * * *